United States Patent
Warloe et al.

(10) Patent No.: US 8,599,069 B2
(45) Date of Patent: Dec. 3, 2013

(54) METHOD AND SYSTEM FOR POLAR QUANTIZATION FOR GNSS DATA

(75) Inventors: Andreas Warloe, Fountain Valley, CA (US); Charles Norman, Huntington Beach, CA (US); Jason Goldberg, Menlo Park, CA (US); Charles Abraham, Los Gatos, CA (US); Jared Welz, Seal Beach, CA (US)

(73) Assignee: Broadcom Corporation, Irvine, CA (US)

( * ) Notice: Subject to any disclaimer, the term of this patent is extended or adjusted under 35 U.S.C. 154(b) by 145 days.

(21) Appl. No.: 12/643,407

(22) Filed: Dec. 21, 2009

(65) Prior Publication Data

US 2011/0148702 A1  Jun. 23, 2011

(51) Int. Cl.
*G01S 19/37* (2010.01)
*G01S 19/35* (2010.01)

(52) U.S. Cl.
CPC ................ *G01S 19/37* (2013.01)
USPC ............. 342/357.77; 342/357.75

(58) Field of Classification Search
CPC ............... G01S 19/35; G01S 19/37
USPC ............... 342/357.2–357.78
See application file for complete search history.

(56) References Cited

U.S. PATENT DOCUMENTS

| | | | | |
|---|---|---|---|---|
| 5,825,241 A * | 10/1998 | Beale et al. | ............ | 329/304 |
| 6,421,400 B1 * | 7/2002 | Rhee et al. | ............ | 375/329 |
| 7,069,019 B2 * | 6/2006 | Sahai et al. | ............ | 455/456.1 |
| 2006/0251173 A1 * | 11/2006 | Wang et al. | ............ | 375/240.24 |
| 2007/0258511 A1 * | 11/2007 | Knight et al. | ............ | 375/149 |

* cited by examiner

*Primary Examiner* — Gregory C Issing
*Assistant Examiner* — Nga X Nguyen
(74) *Attorney, Agent, or Firm* — Sterne, Kessler, Goldstein & Fox P.L.L.C.

(57) ABSTRACT

A global navigation satellite system (GNSS) receiver may be operable to quantize two-dimensional GNSS sample data with an in-phase (I) and quadrature (Q) pair to two-dimensional quantized data with a magnitude and angle pair using the polar quantization, for example, an unrestricted polar quantization. The GNSS receiver may be operable to reduce a size of the two-dimensional quantized data for storage by representing the two-dimensional quantized data by the one-dimensional symbol data. The one-dimensional symbol data may be stored in a random access memory (RAM) for further processing. The I and Q pair associated with the one-dimensional symbol data stored in the RAM may be retrieved and processed by the GNSS receiver using a correlation such as a fast Fourier transform (FFT) correlation.

20 Claims, 4 Drawing Sheets

METHOD AND SYSTEM FOR POLAR QUANTIZATION FOR GNSS DATA

CROSS-REFERENCE TO RELATED APPLICATIONS/INCORPORATION BY REFERENCE

[Not applicable]

FIELD OF THE INVENTION

Certain embodiments of the invention relate to communication systems. More specifically, certain embodiments of the invention relate to a method and system for polar quantization for GNSS data.

BACKGROUND OF THE INVENTION

A global navigation satellite system (GNSS) utilizes an earth-orbiting constellation of a plurality of satellites each broadcasting GNSS signals which indicates its precise location and ranging information. From particular locations on or near the earth, GNSS receivers may detect valid GNSS signals and take various GNSS measurements such as pseudorange, carrier phase, and/or Doppler to calculate navigation information such as GNSS receiver position, velocity, and time. The American global positioning system (GPS), the Russian GLObal NAvigation Satellite System (GLONASS), the European Galileo positioning system and the Chinese Compass navigation system are examples of GNSSs.

The GNSS may be a direct sequence spread spectrum (DSSS) based system such as, for example, a code division multiple access (CDMA) based system. A GNSS satellite may transmit signals modulated with a spreading code such as, for example, a pseudorandom noise (PRN) code. A GNSS receiver may process the received signals by correlating or de-spreading the signals with the same spreading code.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for polar quantization for GNSS data, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for polar quantization for GNSS data. In various embodiments of the invention, a global navigation satellite system (GNSS) receiver may be operable to represent two-dimensional GNSS sample data with an in-phase (I) and quadrature (Q) pair by one-dimensional symbol data utilizing polar quantization. In this regard, the GNSS receiver may be operable to quantize the two-dimensional GNSS sample data with the I and Q pair to two-dimensional quantized data with a magnitude and angle pair using the polar quantization. The GNSS receiver may be operable to reduce a size of the two-dimensional quantized data for storage by representing the two-dimensional quantized data by the one-dimensional symbol data. A look up table (LUT) may be utilized by the GNSS receiver to enable the quantization of the two-dimensional GNSS sample data with the I and Q pair to the two-dimensional quantized data with the magnitude and angle pair and the representing of the two-dimensional quantized data by the one-dimensional symbol data. The one-dimensional symbol data may be stored in a random access memory (RAM) in the GNSS receiver.

The GNSS receiver may be operable to retrieve the I and Q pair associated with the one-dimensional symbol data stored in the RAM using the look up table reversely or a reverse look up table. The retrieved I and Q pair associated with the one-dimensional symbol data may be processed by the GNSS receiver using a correlation such as, for example, a fast Fourier transform (FFT) correlation, a matched filter or a correlator. The correlated I and Q pair may be represented by one-dimensional symbol data using the look up table and stored in the RAM in the GNSS receiver. The look up table and the reverse look up table may be stored in a read only memory (ROM) or the RAM in the GNSS receiver. The polar quantization used may be, for example, an unrestricted polar quantization.

Figure 1:
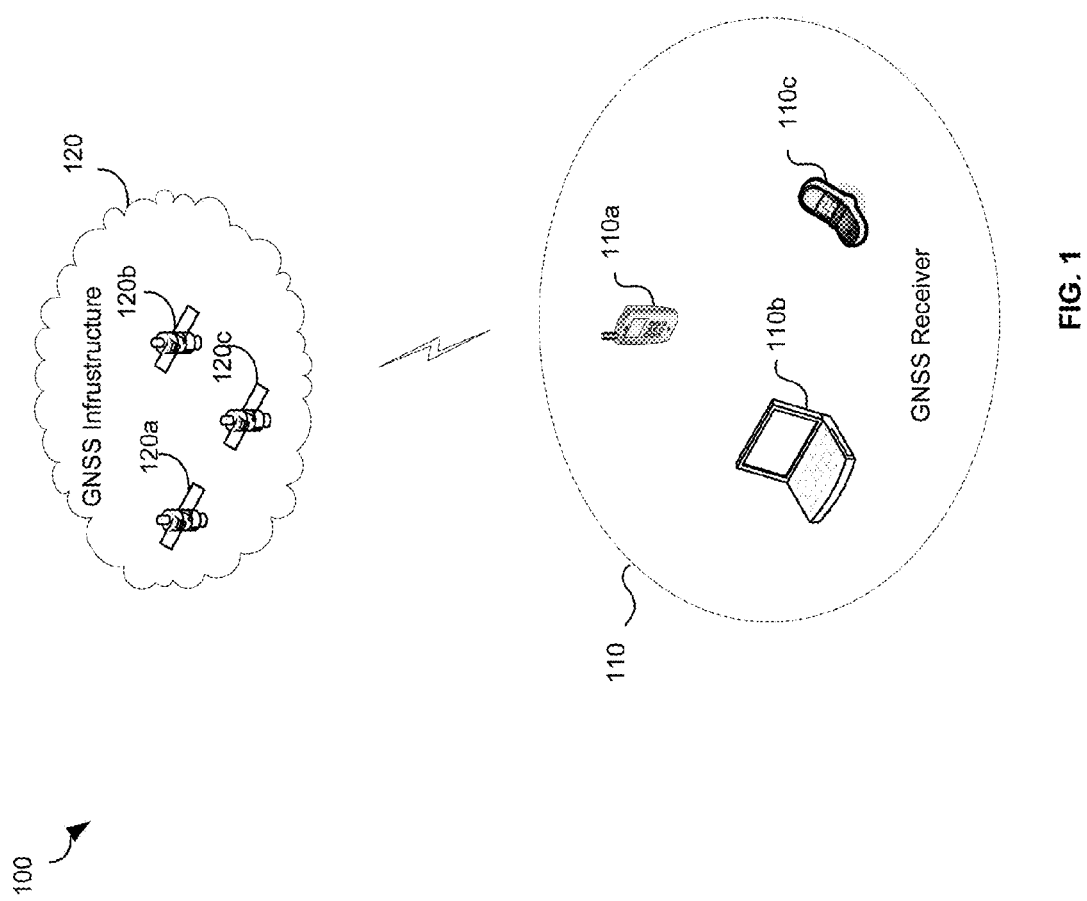
FIG. 1 is a block diagram illustrating an exemplary communication system that is operable to provide polar quantization for GNSS data, in accordance with an embodiment of the invention.

FIG. 1 is a block diagram illustrating an exemplary communication system that is operable to provide polar quantization for GNSS data, in accordance with an embodiment of the invention. Referring to FIG. 1, there is shown a communication system 100. The communication system 100 comprises a plurality of GNSS receivers 110 of which GNSS receivers 110a-110c are illustrated, a GNSS infrastructure 120. The GNSS infrastructure 120 comprises a plurality of GNSS satellites such as GNSS satellites 120a through 120c.

The GNSS receiver such as the GNSS receiver 110a may comprise suitable logic, circuitry, interfaces and/or code that may be operable to receive GNSS broadcast signals from a plurality of visible GNSS satellites such as GNSS satellites 120a through 120c in the GNSS infrastructure 120.

GNSS signals may be sampled, for example, into complex sample data with an in-phase (I) and quadrature (Q) pair. The I and Q pair may be thought of as x and y coordinates in two-dimensional data space. A quantization, for example, a polar quantization may be used to minimize sample storage during a process of GNSS sample data such as, for example, a FFT correlation process. Polar quantized data may be represented as a magnitude and angle pair in two-dimensional polar space.

The GNSS receiver 110a may be operable to represent two-dimensional GNSS sample data with an I and Q pair by one-dimensional symbol data utilizing polar quantization. The two-dimensional GNSS sample data with the I and Q pair may be quantized by the GNSS receiver 110a using the polar quantization to generate two-dimensional quantized data with a magnitude and angle pair. In order to reduce a size of the two-dimensional quantized data to save on storage, the two-dimensional quantized data may be represented as one-dimensional symbol data. A look up table may be utilized by the GNSS receiver 110a for quantization of the two-dimensional GNSS sample data and for representation of the two-dimensional quantized data by the one-dimensional symbol data. The GNSS receiver 110a may be operable to store the one-dimensional symbol data in a RAM in the GNSS receiver 110a for further processing.

In an exemplary embodiment of the invention, the GNSS signals may be quantized directly to the two-dimensional quantized data with the magnitude and angle pair using the polar quantization.

The GNSS receiver 110a may be operable to retrieve the I and Q pair associated with the one-dimensional symbol data stored in the RAM using the look up table reversely or a reverse look up table. The retrieved I and Q pair associated with the one-dimensional symbol data may be processed by the GNSS receiver 110a using a correlation such as, for example, a FFT correlation, a matched filter or a correlator. The correlated I and Q pair may be represented by one-dimensional symbol data using the look up table and stored in the RAM in the GNSS receiver 110a which may be retrieved for further processing such as, for example, a non-coherent accumulation. The look up table and the reverse look up table may be stored in a ROM or the RAM in the GNSS receiver 110a.

In an exemplary embodiment of the invention, the magnitude and angle pair associated with the one-dimensional symbol data stored in the RAM may be retrieved for the correlation process such as, for example, the FFT correlation.

In an exemplary embodiment of the invention, the polar quantization used may be, for example, an unrestricted polar quantization in which quantization levels such as magnitude increments and angle increments may not be equally spaced. The unrestricted polar quantization may be used to minimize an average quantization loss by placing more quantization data points closer to the center of the data space.

The GNSS satellite such as the GNSS satellite 120a may comprise suitable logic, circuitry, interfaces and/or code that may be operable to provide satellite navigational information or data to various GNSS receivers on earth such as, for example, the GNSS receivers 110a through 110c.

In operation, the GNSS receiver 110a may be operable to detect and receive GNSS signals from, for example, the GNSS satellites 120a-120c. The GNSS receiver 110a may be operable to represent two-dimensional GNSS sample data with an I and Q pair by one-dimensional symbol data utilizing polar quantization such as, for example, an unrestricted polar quantization. The two-dimensional GNSS sample data with the I and Q pair may be quantized by the GNSS receiver 110a using the polar quantization to generate two-dimensional quantized data with a magnitude and angle pair. The GNSS receiver 110a may be operable to reduce a size of the two-dimensional quantized data for storage by representing the two-dimensional quantized data by the one-dimensional symbol data. A look up table may be utilized by the GNSS receiver 110a for quantization of the two-dimensional GNSS sample data and for representation of the two-dimensional quantized data by the one-dimensional symbol data. The GNSS receiver 110a may be operable to store the one-dimensional symbol data in a RAM in the GNSS receiver 110a for further processing.

The GNSS receiver 110a may be operable to retrieve the I and Q pair associated with the one-dimensional symbol data stored in the RAM using the look up table reversely or a reverse look up table. The retrieved I and Q pair associated with the one-dimensional symbol data may be processed by the GNSS receiver 110a using a correlation. The correlated I and Q pair may be represented by one-dimensional symbol data using the look up table and stored in the RAM in the GNSS receiver 110a. The look up table and the reverse look up table may be stored in a ROM or the RAM in the GNSS receiver 110a.

Figure 2:
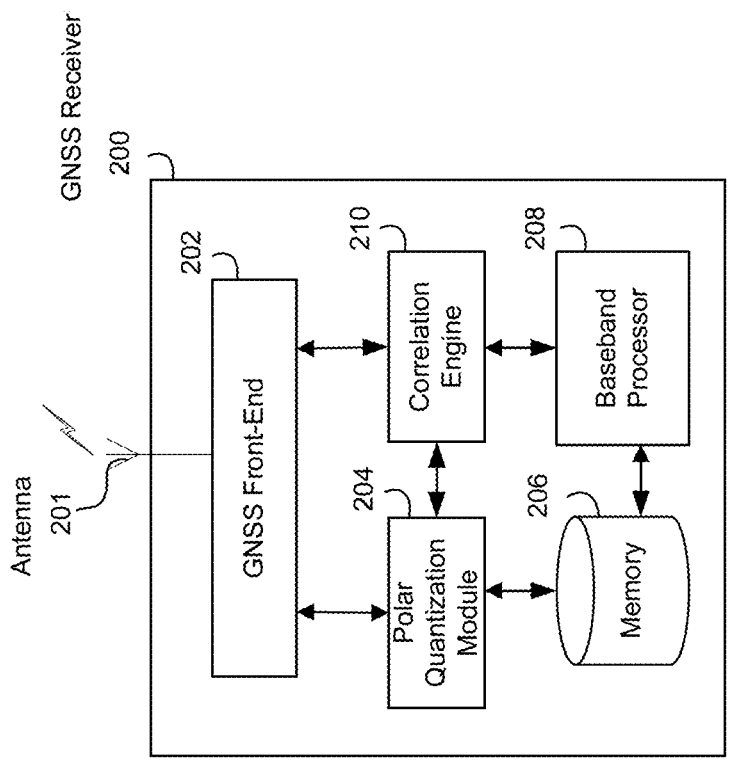
FIG. 2 is a block diagram illustrating an exemplary GNSS receiver that is operable to provide polar quantization for GNSS data, in accordance with an embodiment of the invention.

FIG. 2 is a block diagram illustrating an exemplary GNSS receiver that is operable to provide polar quantization for GNSS data, in accordance with an embodiment of the invention. Referring to FIG. 2, there is shown a GNSS receiver 200. The GNSS receiver 200 may comprise an antenna 201, a GNSS front-end 202, a polar quantization module 204, a memory 206, a baseband processor 208 and a correlation engine 210.

The antenna 201 may comprise suitable logic, circuitry, interfaces and/or code that may be operable to receive GNSS signals from a plurality of visible GNSS satellites such as the GNSS satellites 120a through 120c. The antenna 201 may be operable to communicate the received GNSS signals to the GNSS front-end 202 for further processing.

The GNSS front-end 202 may comprise suitable logic, circuitry, interfaces and/or code that may be operable to convert the received GNSS signals to GNSS baseband signals, which may be suitable for further processing in the polar quantization module 204, the correlation engine 210 and/or the baseband processor 208.

The polar quantization module 204 may comprise suitable logic, circuitry, interfaces and/or code that may be operable to represent two-dimensional GNSS sample data with an I and Q pair by one-dimensional symbol data utilizing polar quantization. The polar quantization module 204 may be operable to quantize the two-dimensional GNSS sample data with the I and Q pair to two-dimensional quantized data with a magnitude and angle pair using the polar quantization. A size of the two-dimensional quantized data may be reduced for storage by representing the two-dimensional quantized data by the one-dimensional symbol data. A look up table may be utilized by the polar quantization module 204 for quantization of the two-dimensional GNSS sample data and for representation of the two-dimensional quantized data by the one-dimensional symbol data. The one-dimensional symbol data may be stored in a RAM in the memory 206, temporarily, for further processing.

The polar quantization module 204 may be operable to retrieve the I and Q pair associated with the one-dimensional symbol data stored in the RAM in the memory 206 using the look up table reversely or a reverse look up table. The retrieved I and Q pair associated with the one-dimensional symbol may be processed by the correlation engine 210 using a correlation. The correlated I and Q pair may be represented by one-dimensional symbol data using the look up table and stored in the RAM in the memory 206. The look up table and the reverse look up table may be stored in a ROM or the RAM in the memory 206. The polar quantization used may be, for example, an unrestricted polar quantization in which quantization levels such as magnitude increments and angle increments may not be equally spaced. The unrestricted polar quantization may be used to minimize an average quantization loss by placing more quantized data points closer to the center of the data space.

The memory 206 may comprise suitable logic, circuitry, interfaces and/or code that may be operable to store information such as executable instructions, data and/or database that may be utilized by the polar quantization module 204, the baseband processor 208 and the correlation engine 210. The memory 206 may comprise RAM, ROM, low latency non-volatile memory such as flash memory and/or other suitable electronic data storage. The look up table and the reverse look up table may be stored in the ROM or the RAM in the memory 206 for forward table look-up and/or reverse table look-up. The one-dimensional symbol data may be stored in the RAM in the memory 206 for further processing.

The baseband processor 208 may comprise suitable logic, circuitry, interfaces and/or code that may be operable to process GNSS baseband signals from the GNSS front-end 202 and/or the correlation engine 210. The baseband processor 208 may be operable to calculate navigation information or data for various navigation applications.

The correlation engine 210 may comprise suitable logic, circuitry, interfaces and/or code that may be operable to process or de-spread GNSS sample data using a correlation such as, for example, a frequency domain FFT correlation, a matched filter or a correlator. The correlation engine 210 may be operable to process the retrieved I and Q pair associated with the one-dimensional symbol data using the correlation, for example, the FFT correlation in frequency domain.

In operation, the antenna 201 may be operable to receive GNSS signals for GNSS measurements. The GNSS front-end 202 may be operable to process the received GNSS signals and convert the signals into GNSS baseband signals. The polar quantization module 204 may be operable to represent two-dimensional GNSS sample data with an I and Q pair by one-dimensional symbol data utilizing polar quantization such as, for example, an unrestricted polar quantization. The two-dimensional GNSS sample data with the I and Q pair may be quantized to generate two-dimensional quantized data with a magnitude and angle pair using the polar quantization. The polar quantization module 204 may be operable to reduce a size of the quantized data for storage by representing the two-dimensional quantized data by the one-dimensional symbol data. A look up table may be utilized by the polar quantization module 204 for quantization of the two-dimensional GNSS sample data and for representation of the two-dimensional quantized data by the one-dimensional symbol data. The one-dimensional symbol data may be stored in a RAM in the memory 206 for further processing.

The polar quantization module 204 may be operable to retrieve the I and Q pair associated with the one-dimensional symbol data stored in the RAM using the look up table reversely or a reverse look up table. The retrieved I and Q pair associated with the one-dimensional symbol data may be processed by the correlation engine 210 using, for example, a FFT correlation. The correlated I and Q pair may be represented by one-dimensional symbol data using the look up table and stored in the RAM in the memory 206. The look up table and the reverse look up table may be stored in the ROM or the RAM in the memory 206.

Figure 3:
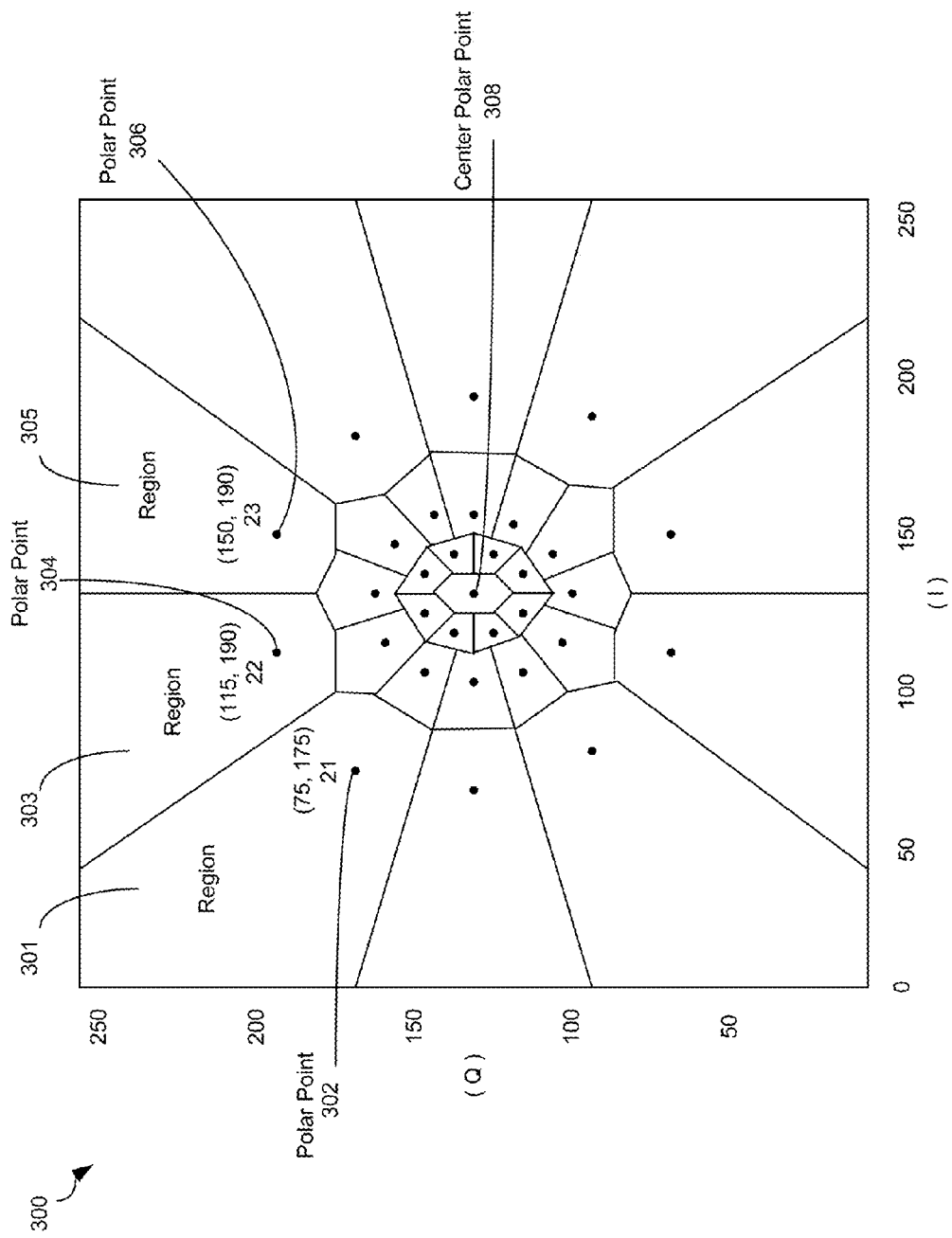
FIG. 3 is a block diagram illustrating an exemplary plotting of a look up table for polar quantization, in accordance with an embodiment of the invention.

FIG. 3 is a block diagram illustrating an exemplary plotting of a look up table for polar quantization, in accordance with an embodiment of the invention. Referring to FIG. 3, there is shown a square figure 300 representing a two-dimensional look up table. The horizontal axis of the square figure 300 may represent 8-bit numbers associated with in-phase (I) and the vertical axis may represent 8-bit numbers associated with quadrature (Q). The square figure 300 shows how a polar quantization can be used to map, for example, (8-bit I, 8-bit Q) points into 31 polar points. The square figure 300 may be divided into a plurality of regions such as, for example, regions 301, 303 and 305. Each region may comprise a plurality of (I, Q) points. The square figure 300 may comprise a plurality of polar points such as, for example, polar points 302, 304, 306 and 308. The center polar point 308 may represent, for example, a sample data of a blanking signal. In the exemplary embodiment of the invention illustrated in FIG. 3, the square figure 300 has 31 regions, one center polar point, 8 polar points in the inner ring, 12 polar points in the second ring and 10 polar points in the outer ring. Notwithstanding, the invention is not so limited and the number of the regions and the number of the polar points may be different.

In each region, there is a polar point such that (I, Q) points in the region may be mapped into or quantized to the polar point in the region. For example, (I, Q) points in the region 301 may be mapped into or quantized to the polar point 302, (I, Q) points in the region 303 may be mapped into or quantized to the polar point 304, and (I, Q) points in the region 305 may be mapped into or quantized to the polar point 306. Since there are only 31 polar points in the square figure 300, each polar point may be represented by a 5-bit value or symbol. For example, the polar point 302 may be represented by 21 which corresponds to the (75, 175) point, the polar point 304 may be represented by 22 which corresponds to the (115, 190) point, and the polar point 306 may be represented by 23 which corresponds to the (150, 190) point.

In an exemplary embodiment of the invention, the GNSS receiver 200 may be operable to use the square figure 300 to quantize (I, Q) points in a region, for example, the region 301 to a polar point, for example, the polar point 302. The GNSS receiver 200 may be operable to represent the polar point 302 by a 5-bit symbol such as, for example, 21. The 5-bit symbol 21 may be stored in a RAM in the GNSS receiver 200. The GNSS receiver 200 may be operable to utilize the square figure 300 reversely to retrieve the (I, Q) point such as, for example, the (75, 175) point associated with the 5-bit symbol 21 stored in the RAM. The retrieved (75, 175) point may be processed by the GNSS receiver 200 using a correlation such as, for example, a FFT correlation.

Figure 4:
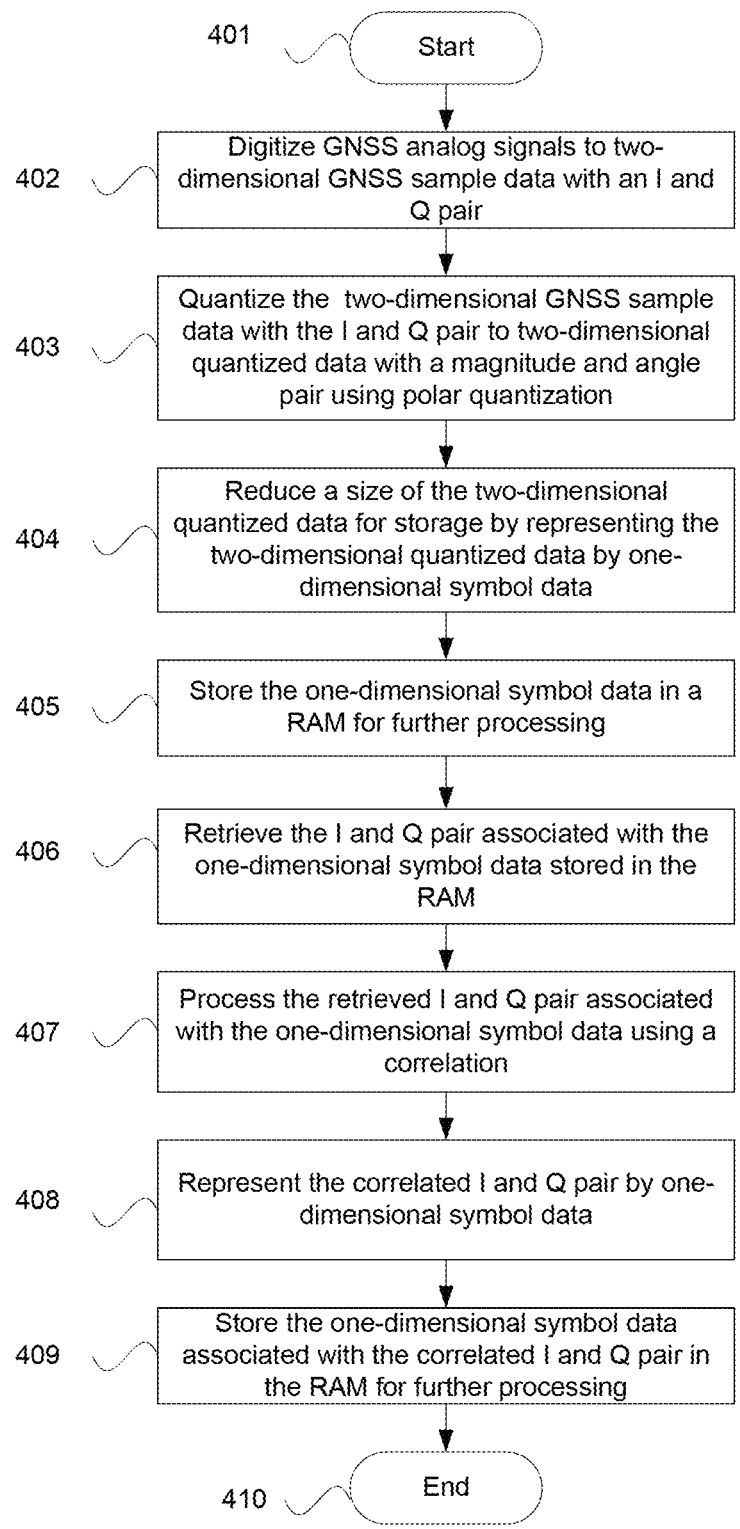
FIG. 4 is a flow chart illustrating exemplary steps for polar quantization for GNSS data, in accordance with an embodiment of the invention.

FIG. 4 is a flow chart illustrating exemplary steps for polar quantization for GNSS data, in accordance with an embodiment of the invention. Referring to FIG. 4, the exemplary steps start at step 401. In step 402, the GNSS receiver 200 may be operable to digitize GNSS analog signals to two-dimensional GNSS sample data with an I and Q pair. In step 403, the GNSS receiver 200 may be operable to quantize the two-dimensional GNSS sample data with the I and Q pair to two-dimensional quantized data with a magnitude and angle pair using polar quantization such as a look up table. In step 404, the GNSS receiver 200 may be operable to reduce a size of the two-dimensional quantized data for storage by representing the two-dimensional quantized data by one-dimensional symbol data using, for example, the look up table. In step 405, the one-dimensional symbol data may be stored in a RAM for further processing. In step 406, the GNSS receiver 200 may be operable to retrieve the I and Q pair associated with the one-dimensional symbol data stored in the RAM using, for example, a reverse look up table. In step 407, the GNSS receiver 200 may be operable to process the retrieved I and Q pair associated with the one-dimensional symbol data using a correlation such as, for example, a FFT correlation. In step 408, the GNSS receiver 200 may be operable to represent the correlated I and Q pair by one-dimensional symbol data using, for example, a reverse look up table. In step 409, the one-dimensional symbol data associated with the correlated I and Q pair may be stored in the RAM for further processing. The exemplary steps may proceed to the end step 410.

In various embodiments of the invention, a GNSS receiver 200 may be operable to represent two-dimensional GNSS sample data with an I and Q pair by one-dimensional symbol data utilizing polar quantization. In this regard, the GNSS receiver 200 may be operable to quantize the two-dimensional GNSS sample data with the I and Q pair to two-dimensional quantized data with a magnitude and angle pair using the polar quantization. The GNSS receiver 200 may be operable to reduce a size of the two-dimensional quantized data for storage by representing the two-dimensional quantized data by the one-dimensional symbol data. A look up table 300 may be utilized by the GNSS receiver 200 to enable the quantization of the two-dimensional GNSS sample data with the I and Q pair to the two-dimensional quantized data with the magnitude and angle pair and the representing of the two-dimensional quantized data by the one-dimensional symbol data. The one-dimensional symbol data may be stored in a random access memory (RAM) 206 in the GNSS receiver 200.

The GNSS receiver 200 may be operable to retrieve the I and Q pair associated with the one-dimensional symbol data stored in the RAM 206 using the look up table 300 reversely or a reverse look up table. The retrieved I and Q pair associated with the one-dimensional symbol data may be processed by the GNSS receiver 200 using a correlation such as, for example, a FFT correlation, a matched filter or a correlator. The correlated I and Q pair may be represented by one-dimensional symbol data using the look up table 300 and stored in the RAM 206 in the GNSS receiver 200. The look up table 300 and the reverse look up table may be stored in a ROM 206 or the RAM 206 in the GNSS receiver 200. The polar quantization used may be, for example, an unrestricted polar quantization.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for polar quantization for GNSS data.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data using a global navigation satellite system (GNSS) receiver, the method comprising:
   generating two-dimensional GNSS sample data comprising a plurality of in-phase (I) and quadrature (Q) pairs;
   quantizing said two-dimensional GNSS sample data;
   representing the quantized two-dimensional GNSS sample data as one-dimensional symbol data having a polar point, wherein said polar point represents two or more I and Q pairs of said GNSS sample data, wherein said one-dimensional symbol data represent a region associated with said two-dimensional GNSS sample data said region including a first I and Q pair and at least one other I and Q pair of said two-dimensional GNSS sample data;
   retrieving an I and Q pair associated with said polar point; and
   processing the I and Q pair associated with said polar point using a correlation.

2. The method according to claim 1, wherein said representing reduces a size of said two-dimensional data for storage.

3. The method according to claim 1, further comprising quantizing said two-dimensional GNSS sample data and wherein said representing of said two-dimensional GNSS is performed using a look up table.

4. The method according to claim 3, further comprising storing said one-dimensional symbol data in a random access memory (RAM) in said GNSS receiver.

5. The method according to claim 4, wherein said I and Q pair associated with said one-dimensional symbol data are stored in said RAM; and
   wherein said processing comprises processing said retrieved I and Q pair associated with said one-dimensional symbol data using said correlation.

6. The method according to claim 5, further comprising:
   converting said processed I and Q pair to one-dimensional symbol data using said look up table; and
   storing said one-dimensional symbol data associated with said processed I and Q pair in said RAM in said GNSS receiver.

7. The method according to claim 5, wherein said correlation comprises one of a fast Fourier transform (FFT) correlation, a matched filter, and a correlator.

8. The method according to claim 5, further comprising performing said retrieving of said I and Q pair associated with said one-dimensional symbol data using said look up table reversely or a reverse look up table.

9. The method according to claim 8, further comprising:
   storing said look up table in a read only memory (ROM) or said RAM in said GNSS receiver; and
   storing said reverse look up table in said ROM or said RAM in said GNSS receiver.

10. The method according to claim 1, wherein said polar quantization comprises an unrestricted polar quantization.

11. A system for communication using a global navigation satellite system (GNSS) receiver, the system comprising:

a GNSS front-end configured to generate two-dimensional GNSS sample data comprising a plurality of in-phase (I) and quadrature (Q) pairs;

a quantization module configured to:
  quantize said two-dimensional GNSS sample data;
  represent the quantized two-dimensional GNSS sample data as one-dimensional symbol data having a polar point, wherein said polar point represents two or more I and Q pairs of said GNSS sample data, wherein said one-dimensional symbol data represent a region associated with said two-dimensional GNSS sample data, said region including a first I and Q pair and at least one other I and Q pair of said two-dimensional GNSS sample data, and
  retrieve an I and Q pair associated with said polar point; and a correlation engine configured to process the I and Q pair associated with said polar point using a correlation.

12. The system according to claim 11, wherein said quantization module is further configured to:
  reduce a size of said two-dimensional data for storage.

13. The system according to claim 12, wherein said quantization module is further configured to quantize said two-dimensional GNSS sample data and represent said quantized two-dimensional GNSS data using a look up table.

14. The system according to claim 13, wherein said quantization module is further configured to store said one-dimensional symbol data in a random access memory (RAM) in said GNSS receiver.

15. The system according to claim 14, wherein said quantization module is configured to:
  retrieve said I and Q pair associated with said polar point from said RAM; and
  process said two-dimensional GNSS sample data contained in said polar point by processing said retrieved I and Q pair associated with said one-dimensional symbol data using a correlation.

16. The system according to claim 15, wherein said quantization module is configured to:
  convert said processed I and Q pair to one-dimensional symbol data using said look up table; and
  store said one-dimensional symbol data associated with said processed I and Q pair in said RAM in said GNSS receiver.

17. The system according to claim 15, wherein said correlation comprises one of a fast Fourier transform (FFT) correlation, a matched filter, and a correlator.

18. The system according to claim 15, wherein said quantization is configured to perform said retrieving of said I and Q pair associated with said one-dimensional symbol data using said look up table reversely or a reverse look up table.

19. The system according to claim 11, wherein said polar quantization comprises an unrestricted polar quantization.

20. A method for processing data using a global navigation satellite system (GNSS) receiver, comprising:
  digitizing a GNSS analog signal to two-dimensional GNSS sample data with an in-phase (I) and quadrature (Q) pair;
  quantizing said two-dimensional GNSS sample data to two-dimensional quantized data with a magnitude and angle pair using polar quantization;
  reducing a size of said two-dimensional quantized data for storage by representing said two-dimensional quantized data by one-dimensional symbol data, wherein said one-dimensional symbol data represent a reign associated with said two-dimensional GNSS sample data, said region including a first I and Q pair and at least one other I and Q pair of said two-dimensional GNSS sample data;
  storing said one-dimensional symbol data in a memory;
  retrieving an I and Q pair associated with said one-dimensional symbol data from said memory; and
  processing said retrieved I and Q pair associated with said one-dimensional symbol data using a correlation.

* * * * *

UNITED STATES PATENT AND TRADEMARK OFFICE
CERTIFICATE OF CORRECTION

PATENT NO. : 8,599,069 B2  
APPLICATION NO. : 12/643407  
DATED : December 3, 2013  
INVENTOR(S) : Warloe et al.

Page 1 of 1

It is certified that error appears in the above-identified patent and that said Letters Patent is hereby corrected as shown below:

In the Claims:

Column 8, Line 23, replace "sample data said" with --sample data, said--.

Column 10, Line 28, replace "a reign associated" with --a region associated with--.

Signed and Sealed this  
Eleventh Day of February, 2014

Michelle K. Lee  
*Deputy Director of the United States Patent and Trademark Office*